W. R. HAYDEN.
CATTLE POKE.
APPLICATION FILED SEPT. 11, 1916.
1,228,913.
Patented June 5, 1917.
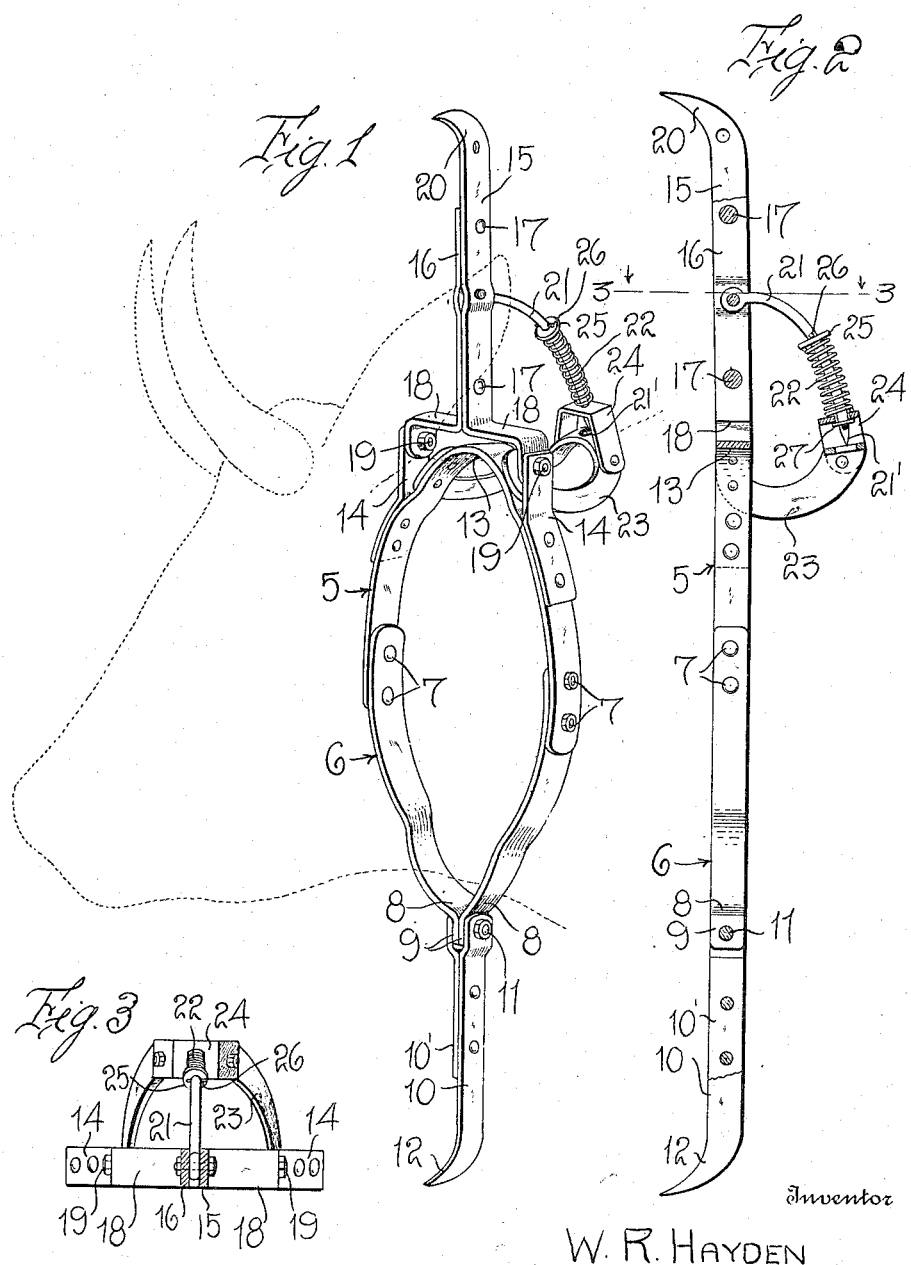
W. R. HAYDEN
By Watson E. Coleman
Attorney

UNITED STATES PATENT OFFICE.

WILLIAM R. HAYDEN, OF INDIANOLA, NEBRASKA.

CATTLE-POKE.

1,228,913.  Specification of Letters Patent.  Patented June 5, 1917.

Application filed September 11, 1916. Serial No. 119,530.

*To all whom it may concern:*

Be it known that I, WILLIAM R. HAYDEN, a citizen of the United States, residing at Indianola, in the county of Redwillow and State of Nebraska, have invented certain new and useful Improvements in Cattle-Pokes, of which the following is a specification, reference being had to the accompanying drawings.

This invention relates to an improved cattle poke and has for its primary object to provide a very simply constructed device of this character which will effectually prevent a cow or other animal pushing its head between the wires of a fence and breaking the same down or becoming entangled in the fence wires.

It is another object of the invention to provide a cattle poke which is so constructed that the same can be very easily and quickly applied to or removed from the neck of the animal.

It is a further general object of my invention to improve and simplify the construction of devices of the above character and render the same durable and efficient in practical use and capable of manufacture at relatively small cost.

With the above and other objects in view, my invention consists in the novel features of construction, combination and arrangement of parts to be hereinafter more fully described, claimed and illustrated in the accompanying drawing, in which, Figure 1 is a perspective view showing my improved cattle poke applied to the neck of the animal;

Fig. 2 is a vertical sectional view thereof; and

Fig. 3 is a horizontal section taken on the line 3—3 of Fig. 2.

Referring in detail to the drawing, 5 designates the upper body section of the cattle poke and 6 two similar sections constituting the lower half of the body. The upper section 5 is formed from one continuous, flat, metal bar to the ends of which the upper ends of the respective lower sections are securely fixed by means of the bolts 7. The lower end of each of the bars 6 is laterally and inwardly extended, as at 8, and terminates in a longitudinally projecting ear 9. A bar 10 has a longitudinal strap 10' securely riveted upon one of its sides, and one end of said bar and the corresponding end of the strap 10' are outwardly offset and spaced apart to receive the ears 9. These ears, as well as the ends of the bar 10 and strap 10', are apertured to receive a connecting bolt 11 upon which the bar 10 has limited pivotal movement. The lower end of this bar 10 is formed with an angularly and forwardly projecting hook 12.

The medial portion of the upper section 5 of the cattle poke is contracted and relatively narrow, as at 13, to extend over and rest upon the top ridge of the animal's neck. To the opposite sides of this narrow portion of the poke section 5, the upwardly extending bracket members 14 are permanently fixed at one of their ends. Metal bars 15 and 16 respectively, of relatively different lengths, are secured to each other by means of the rivets 17. These bars at one of their ends are extended laterally in relatively opposite directions, as at 18, and the terminals thereof are longitudinally extended and loosely mounted for pivotal movement upon the bolts 19 engaged in the brackets 14. The upper end of the bar 15 projects a considerable distance beyond the bar 16 and terminates in a curved, forwardly projecting hook 20. A downwardly curved arm 21 is securely riveted at one of its ends between the bars 15 and 16 and has its lower end pointed and sharpened, as at 21'. The extremities of a substantially U-shaped bar 23 are securely riveted to the upper end portion 13 of the body bar 5 between the bracket members 14. This U-shaped bar extends at a slight upward inclination, and to the same the ends of a vertically disposed guide plate 24 are secured. The intermediate portion of the guide plate is spaced above the central portion of the bar 23, and said guide plate and the bar 23 are provided with vertically alined openings through which the pointed lower end of the rod 21 is movably disposed. Upon the rod 21, intermediate of its ends, a washer plate 25 is engaged and held against a transverse pin 26 fixed in said rod by means of a coil spring 22 disposed upon the rod between the washer plate and the guide 24. This spring normally acts to hold the bars 15 and 16 in an upright position and yieldingly retard the downward movement of the rod 21 through the plate 23. A second washer 27 is also engaged upon the lower end of the rod 21, and by contact with the medial portion of the guide plate 24, limits the upward movement of said rod.

From the above description, taken in connection with the accompanying drawing, the construction and manner of operation of my improved cattle poke will be clearly and fully understood. In applying the device, the upper section 5 of the poke is first arranged upon the upper portion of the animal's neck and the bars or sections 6 then disposed around the lower side of the neck and bolted to the lower ends of the section 5, it being understood of course that the hooks 12 and 20 project in a forward direction. Thus, if the animal attempts to insert its head between the spaced wires of the fence, the top hook 20 catching upon one of the top wires will cause the bars 15 and 16 to turn upon the pivot bolts 19 and be forced rearwardly and downwardly, thus moving the rod 21 downwardly through the bar 23 against the action of the spring 22 and causing the pointed terminal of said rod to penetrate the neck of the animal so that it will desist in its further attempts to break through the fence. The lower hook 12 engaging one of the lower fence wires, will move the upper portion of the poke forwardly on the neck of the animal and cause the bar 16 to engage the top fence wire with the result above described. As soon as pressure upon the bars 15 and 16 is released, the spring 22 will immediately expand and return the same to their normal upright positions.

From the above, it will be seen that I have produced a very simple, durable and serviceable cattle poke which can be easily applied to or removed from the neck of the animal and is highly efficient in its operation. When the animal lies down, the lower hook bar 10 will pivot upon the bolt 11 and move forwardly to such an angle that it will not occasion the animal any great discomfort. The device as a whole consists of comparatively few parts which are of simple form and may obviously be manufactured at small cost. It is apparent that my improved cattle poke can be made in various sizes and the shape of the body sections thereof varied as may be desired.

It is also to be understood that, while I have shown and described the preferred construction and arrangement of the several parts, the same are susceptible of considerable modification therein and I, therefore, reserve the privilege of adopting all such legitimate changes as may be fairly embodied within the spirit and scope of the invention as claimed.

Having thus fully described my invention, what I desire to claim and secure by Letters Patent is:—

1. A cattle poke including a sectional body to embrace the neck of the animal, spaced bracket members fixed to said body, a bar pivotally mounted between said bracket members and having a forwardly projecting hook on its upper end, a guide fixed to said body, a rearwardly and downwardly curved rod secured at one end to said bar and movable through the guide, said rod having a lower pointed end to penetrate the neck of the animal, and a spring arranged upon said rod to yieldingly hold the bar in an upright position and prevent its rearward pivotal movement and retard the downward movement of said rod.

2. A cattle poke including a sectional body to embrace the neck of the animal, spaced bracket members fixed to said body, rigidly connected bars having portions angularly extended in opposite directions and pivotally mounted upon the respective bracket members, one of said bars projecting longitudinally beyond the other and terminating in a forwardly curved hook, a U-shaped bar fixed to said body and extending rearwardly over the neck of the animal, a guide secured upon said U-shaped bar, a rod fixed at one of its ends to said pivoted bars and having its other end pointed to penetrate the neck of the animal, said latter end of the rod extending through coinciding openings in the guide and said U-shaped bar, and a coil spring arranged upon said rod to yieldingly hold the pivoted bars in an upright position and retard the downward movement of said rod through the guide.

In testimony whereof I hereunto affix my signature in the presence of two witnesses.

WILLIAM R. HAYDEN.

Witnesses:
  MARIE T. FOLEY,
  C. S. QUICK, Jr.